United States Patent [19]

Hashimoto

[11] Patent Number: 5,029,340
[45] Date of Patent: Jul. 2, 1991

[54] CATV TERMINAL UNIT HAVING AN IMPROVED DESCRAMBLING OPERATION

[75] Inventor: Takashi Hashimoto, Tokyo, Japan

[73] Assignee: Pioneer Electronic Corporation, Tokyo, Japan

[21] Appl. No.: 498,051

[22] Filed: Mar. 23, 1990

[30] Foreign Application Priority Data

May 26, 1989 [JP] Japan .................................. 1-131399

[51] Int. Cl.[5] ........................................... H04N 7/167
[52] U.S. Cl. ...................................... 380/15; 380/35; 358/172; 358/178
[58] Field of Search ..................... 380/15, 35; 358/146, 358/135, 156, 172, 178

[56] References Cited

U.S. PATENT DOCUMENTS

| | | | |
|---|---|---|---|
| 4,222,068 | 9/1980 | Thompson | 358/120 |
| 4,336,554 | 6/1982 | Okada et al. | 358/124 |
| 4,377,823 | 3/1983 | Mycynek | 358/157 |
| 4,562,465 | 12/1985 | Glaab . | |
| 4,667,232 | 5/1987 | Long | 380/15 |
| 4,670,904 | 6/1987 | Rumreich | 380/15 |
| 4,688,097 | 8/1987 | Lin | 380/15 |
| 4,695,901 | 9/1987 | Ryan | 380/5 |
| 4,725,882 | 2/1988 | Sato et al. | 358/83 |
| 4,790,011 | 12/1988 | Bellavia, Jr. | 380/15 |
| 4,802,214 | 1/1989 | Barany | 380/15 |
| 4,807,285 | 2/1989 | Marland | 380/15 |
| 4,829,372 | 5/1989 | McCalley et al. | 358/146 |
| 4,901,351 | 2/1990 | Tanaka et al. | 380/15 |

OTHER PUBLICATIONS

Examiner's Report to the Comptroller under Section 17 (The Search Report).
WO A1 83/02378 (Scientific-Atlanta), Sync Suppression Scrambling of Television Signals for Subscription TV, publication date 07/07/83.

Primary Examiner—Thomas H. Tarcza
Assistant Examiner—Tod Swann
Attorney, Agent, or Firm—Sughrue, Mion, Zinn, Macpeak & Seas

[57] ABSTRACT

A CATV terminal unit descrambling operation is disclosed wherein unrecovered video pulse portions, existing because a scrambling compression period is longer than a descrambling expansion period, are eliminated. The unrecovered pulse portions are eliminated by substituting a signal having a level equal to or near a pedestal level of the video signal during time intervals when an unrecovered pulse portion is expected. The elimination of the unrecovered pulse portions removes the undesirable effects of luminance changes and turnover noises.

8 Claims, 5 Drawing Sheets

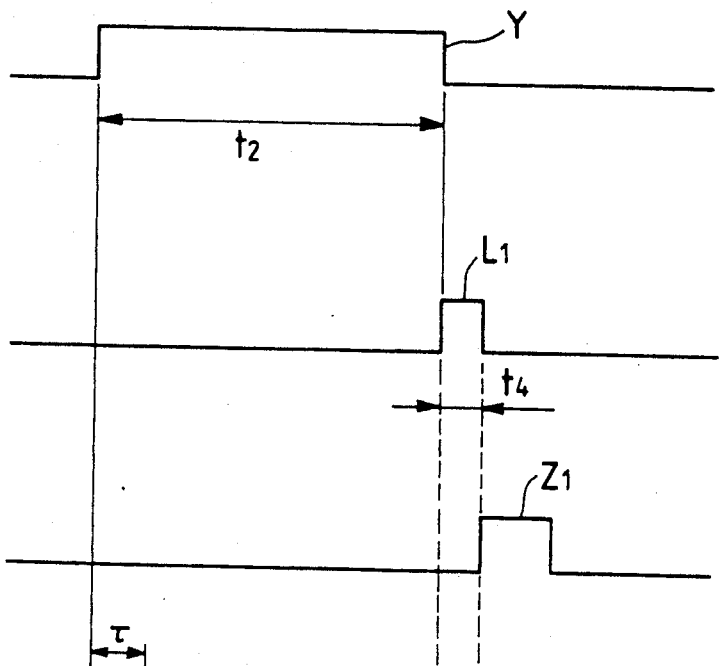
FIG. 4A
FIG. 4B
FIG. 4C
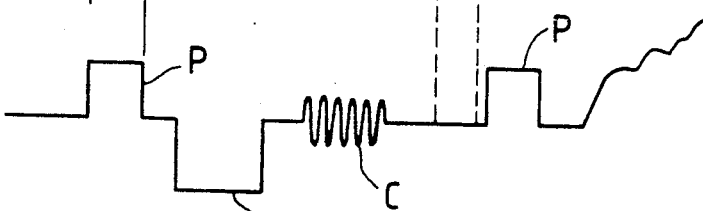
FIG. 4D
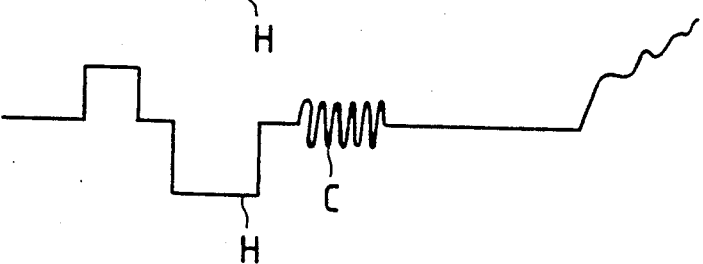
FIG. 4E

CATV TERMINAL UNIT HAVING AN IMPROVED DESCRAMBLING OPERATION

BACKGROUND OF THE INVENTION

The present invention relates to a terminal unit for use in a CATV system in which many such terminal units are connected to a transmitting source center by coaxial cables, and television signals are transmitted from the source center to the terminal units In general, a CATV system is configured so as to transmit a program produced in a source center or a program existing on the air to terminal units through coaxial cables.

In certain cases, programs produced in a source center or existing on the air are chargeable. When such programs are received by a terminal unit, the terminal unit viewer is charged a predetermined fee.

In order to prevent unauthorized viewing (pirating) of a chargeable program, the television signals of such a chargeable program are subjected to a scrambling operation to render them unviewable. These programs are scrambled in advance at the transmitting source center so that the pictures cannot be received by non-paying television viewers.

In a receiving terminal unit where the viewer is authorized to receive a chargeable program, a descrambled means is provided for recovering the original signal Various kinds of such scrambling and descrambling systems have been proposed. For example, a so-called GSS (Gated Sync Suppression) system has been used in which a video signal is subjected to a scrambling operation to form a scrambled signal in which horizontal and vertical synchronizing signal portions are compressed by several decibels so that they cannot be detected in an ordinary television receiver. On the other hand, in a terminal unit authorized to view the television signal, the horizontal and vertical synchronizing signal portions of the compressed scrambled signal are restored to their initial levels, and, therefore, the program signal is detectable by the TV receiver.

FIGS. 6A-6E show the stages of a scrambling and descrambling operation according to the above-mentioned GSS system. More specifically, FIG. 6A shows a base-band video signal. The reference symbol H represents a horizontal synchronizing signal. FIG. 6B shows the video signal modulated into an intermediate frequency (IF) video signal Fv which is transmitted after its horizontal synchronizing signal portion has been compressed by a specific rate, as shown in FIG. 6C(a). Compression rates of 6 dB and 10 dB are typical.

This compressed horizontal synchronizing signal portion includes a horizontal synchronizing signal H and a color burst signal C, and has a time width $t_1$ of, for example, 12 μsec. Further, in the transmitting source center, a key signal K, indicating the compressing operation timing, is superimposed on an FM audio signal Fa (FIG. 6C(b)). The FM audio signal Fa, on which the key signal K is superimposed, and the above-mentioned intermediate frequency video signal Fv are modulated into an RF signal and transmitted to the terminal units.

In a terminal unit, the audio signal Fa is extracted from the received RF signal, and the above-mentioned key signal K is detected from the audio signal Fa. On the basis of the timing of this detected key signal K, horizontal and vertical synchronizing signal portions of the compressed video signal are expanded by 6 dB, 10 dB or the like, corresponding to the compression at the transmitting side, so as to recover the original signal.

The time width $t_2$ during which the video signal is to be expanded in the terminal unit is made to be, for example, 10 μsec, which is a little narrower than the time width $t_1$ used at the time of compressing the video signal, thereby ensuring stability of the descrambling circuit and preventing the loss of a picture portion. As a result, the intermediate frequency video signal Fv recovered in the terminal unit is as shown in FIG. 6D.

The intermediate frequency video signal Fv recovered in the terminal unit is then subjected to AM-detection and reduced to its base-band signal component as shown in FIG. 6E. Next, the audio signal Fa is demodulated and subjected to processing, such as volume control, and thereafter is superimposed onto the video signal after frequency-modulating a 4.5 MHz carrier. The resultant signal is again modulated and sent to a television receiver in a home.

As has been mentioned above, in the compressing and expanding processing, during the scrambling and descrambling operations according to the GSS system, the time width $t_2$ at the time of expanding is made to be a little shorter than the time width $t_1$ at the time of compressing. This time difference is necessary because, in addition to the above-mentioned reasons, if the expanding operation is performed with the same time width as that of the compressing operation, then, for example, a portion which has not been compressed would be expanded in the terminal unit because of, for example, a slight shift in the timing in the signal processing between the video signal Fv and the audio signal Fa including the key signal K, so that a black level pulse, whose level is equal to that of the horizontal synchronizing signal, would be produced slightly ahead of a horizontal synchronizing signal or slightly behind a color burst signal on a descrambled signal. Therefore, the synchronization process would be negatively affected by this black level pulse to thereby produce a shift in synchronization, causing a problem in that a normal picture would not be reproduced.

On the other hand, an "unrecovered portion", that is, a white level pulse P (as shown in FIG. 6D), which is caused by the difference between the time width $t_1$ at the time of compressing and the time width $t_2$ at the time of expanding, will induce luminance changes, turnover noises and other undesirable effects in a television receiver whose performance has deteriorated due to time aging or the like, or in a television receiver which is adjusted somewhat imperfectly.

These undesirable effects are caused for the following reason. In a television receiver, generally, in order to establish a reference level of a luminance signal, a window is set in the back porch portion including the color burst signal C so that a luminance reference level is obtained from the level output obtained by this window portion (pedestal clamping). Therefore, the unrecovered white level pulse P moves into or out of the window under the influence of jitter or the like, causing the above-mentioned problems to occur.

Recently, for the purpose of improving the quality of picture reproduction, some TV receivers employ a black level correction function. This television receiver is configured such that the black level of a color burst portion is detected to decide whether the black level correction should be performed or not. Therefore, there occurs a phenomenon whereby the black level correction is caused to turn on or off due to the fact that the portion of an unrecovered white level pulse P moves into or out of the detection region. Accordingly, with respect to such a television receiver, there is a problem in that the unrecovered white level pulse P may interfere with the operation of this black level correction function.

SUMMARY OF THE INVENTION

The present invention has been made to cure these problems of the prior art, and an object of the invention is to provide a terminal unit for preventing the causes of undesirable effects, such as luminance changes, turnover noises and so on, even in the case of a television set which has either deteriorated by time aging or is imperfectly adjusted, and for preventing the causes of interference with the operation of a black level correction function.

In order to achieve these objects, the terminal unit according to the present invention has a feature that eliminates a white level pulse P by either replacing the pulse P with a clamp pedestal level obtained by a level clamp circuit, extracting and integrating a color burst signal portion, or replacing the pulse P with a fixed DC signal corresponding to a pedestal level.

According to the above-mentioned feature, a DC output, equal to or near a pedestal level, is substituted for a white level pulse P during the timing of an unrecovered portion of the video signal, thereby solving the conventional problems caused by the scrambling and descrambling operations of the GSS system.

BRIEF DESCRIPTION OF THE DRAWINGS

FIGS. 4A to 4E are waveform diagrams for explaining a modification of the second embodiment.

DETAILED DESCRIPTION OF PREFERRED EMBODIMENTS

Embodiments of the present invention will be described with reference to the drawings.

Figure 1:
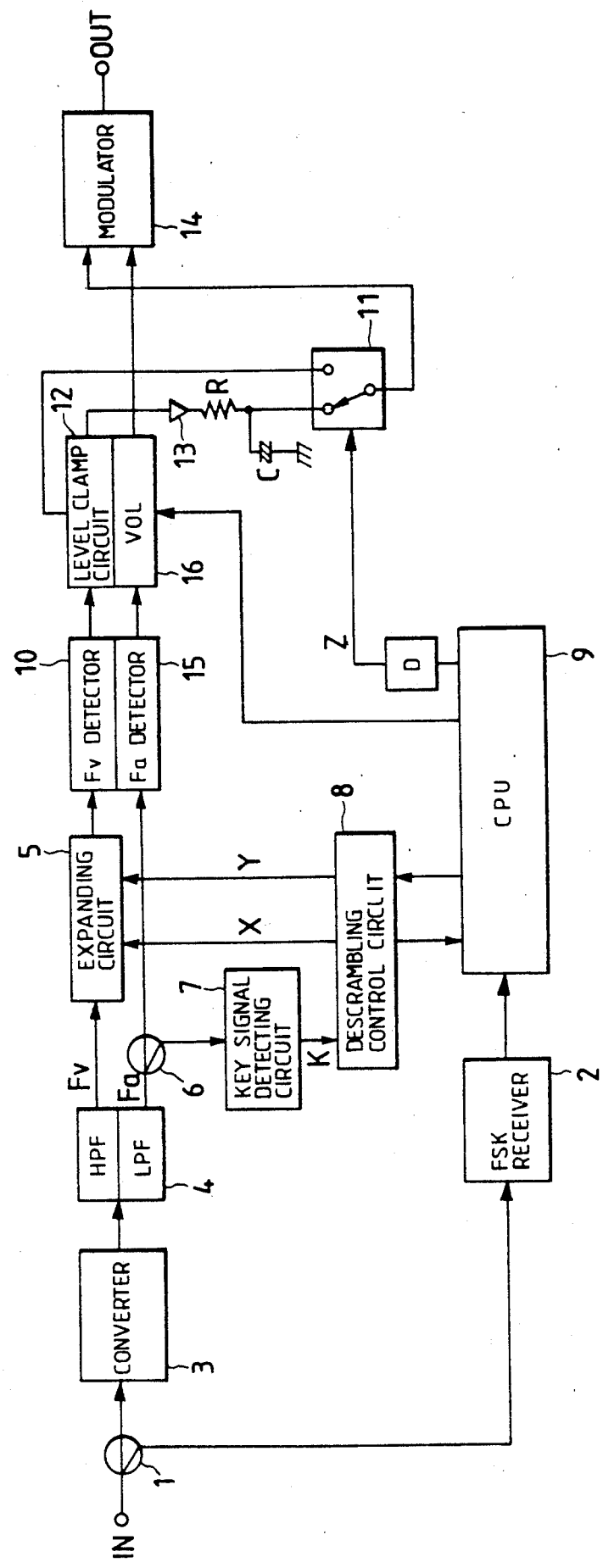
FIG. 1 is a block diagram illustrating a first embodiment of the present invention.

FIG. 1 shows an embodiment of the CATV terminal unit according to the present invention. In FIG. 1, a signal transmitted from a source center through a coaxial cable is applied to an input terminal IN and is branched by a branching device 1.

The signal branched by the branching device 1 is applied to an FSK receiver 2 in which out-band data is extracted. The other output of the branching device 1 is applied to a converter 3. This converter 3 selects a specific channel, frequency-converts a signal of the selected channel, and outputs the signal as an intermediate frequency (IF) signal at an output terminal thereof The intermediate frequency signal obtained at the output of the converter 3 is fed to a filter circuit 4 consisting of a high pass filter HPF and a low pass filter LPF. In the filter circuit 4, the intermediate frequency signal is separated into a high band video intermediate frequency signal Fv and a low band audio intermediate frequency signal Fa.

The video intermediate frequency signal Fv is applied to an expanding circuit 5 in which the video intermediate frequency signal Fv is descrambled. Meanwhile, the audio intermediate frequency signal Fa is branched by a branching device 6, and a part thereof is applied to a key signal detecting circuit 7 in which a key signal K, superimposed on the audio intermediate frequency signal Fa, is extracted. This key signal K includes timing information used in compressing the horizontal synchronizing signal portion of the video signal Fv at a transmitting source center, and in expanding the horizontal synchronizing signal portion in a terminal unit. The output of the key signal detecting circuit 7 is applied to a descrambling control circuit 8. Further, in a GSS system, in order to detect a vertical synchronizing signal, the absence of the key signal K before a horizontal synchronizing signal is detected as a trigger to produce vertical synchronizing signal timing.

The above-mentioned out-band data obtained by the FSK receiver 2 is applied to a CPU 9 which operates on the basis of a predetermined program. The expansion data for a horizontal synchronizing signal portion in a video signal is decoded in the CPU 9. The expansion data supplied from the CPU 9 and the key signal K are applied to the descrambling control circuit 8 which supplies the expanding circuit 5 with an expansion rate control signal X and an expansion timing signal Y. On the basis of these signals, the expanding circuit 5 descrambles the scrambled video signal Fv.

The video intermediate frequency signal descrambled by the expanding circuit 5 is detected by a video signal detector 10, the output of which is applied to a level clamp circuit 12.

The level clamp circuit 12 keeps the DC level of the video signal at a pedestal level based on the horizontal sync DC level of the base-band video signal, and the clamped voltage is applied to a video switch 11 directly and through a buffer amplifier 13. The video switch 11 selectively outputs the clamped video signal or the clamp pedestal level (voltage of a capacitor C) in accordance with a switch control signal Z (which will be described later) from the CPU 9, and the output of the video switch 11 is supplied to a modulator 14.

On the other hand, the audio intermediate frequency signal Fa extracted by the filter circuit 4 is applied to an audio signal detector 15 in which the audio intermediate frequency signal Fa is demodulated into a base-band audio signal which is, in turn, applied to a volume control circuit 16. The audio signal is volume-controlled in the volume control circuit 16 by a control signal from the CPU 9, and the output of the volume control circuit 16 is applied to the modulator 14, together with the above-mentioned video signal from the video switch 11. The video signal and the audio signal are modulated by the modulator 14 to have a predetermined frequency and then are sent out through an output terminal OUT.

FIG. 2 shows timing charts for explaining the operative relationship between the expanding circuit 5 and the video switch 11 in FIG. 1. In FIG. 2, for the convenience of description, a video signal is shown in the form of a base-band signal.

Figure 2A:
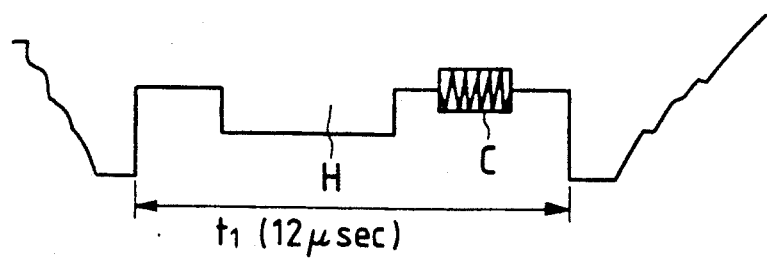
FIGS. 2A to 2F are waveform diagrams for explaining the operation thereof.
Figure 2B:
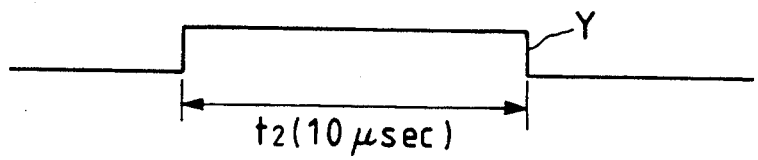
Figure 2C:
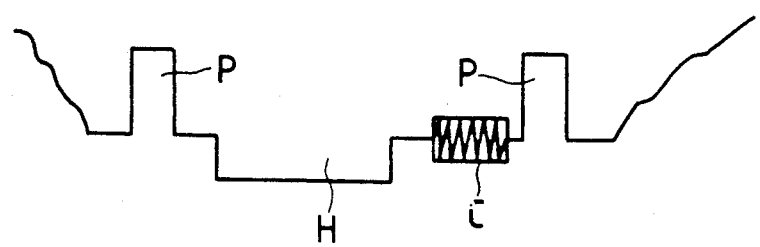

FIG. 2A shows a video signal transmitted from the source center. In this video signal, as mentioned above, its horizontal synchronizing signal portion, including the horizontal synchronizing signal H and the color burst signal C, is compressed to a predetermined level, with a time width $t_1$ of, in this case, 12 μsec. FIG. 2B shows an expansion timing signal Y for descrambling, which is produced on the basis of the key signal K, obtained by the key signal detecting circuit 7, having a time width $t_2$ of, in this example, 10 μsec. The expansion timing signal Y shown in FIG. 2B acts on the video signal shown in FIG. 2A so as to produce a descrambled signal shown in FIG. 2C.

The base-band signal of this descrambled signal is output from the video signal detector 10.

Figure 2D:
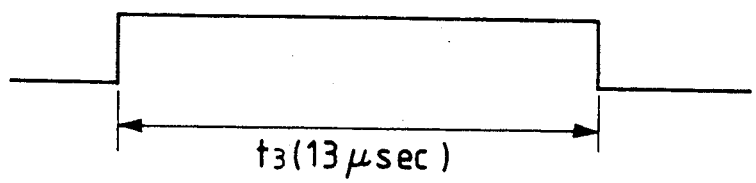
Figure 2E:
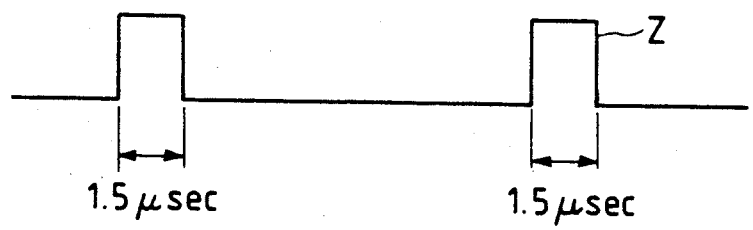

Then, the output of the key signal detecting circuit 7 is supplied to the CPU 9 through the descrambling control circuit 8, and a timing waveform shown in FIG. 2D is obtained in CPU 9. This waveform has a time width $t_3$ of, for example, 13 μsec, covering the front and rear sides of the expansion timing signal Y of FIG. 2B. By logically XORing the expansion timing signal Y and the timing waveform shown in FIG. 2D, there is produced a video switch control signal Z shown in FIG. 2E. The control signal Z is delayed by a delay circuit D to compensate for a delay time occurring in the video signal detector 10.

The video switch 11 is controlled by the signal Z, so that the output of the switch 11 is switched to the clamp pedestal level from the level clamp circuit 12 only when the signal Z is a high output, that is, only when the unrecovered pulse P is present.

Figure 2F:
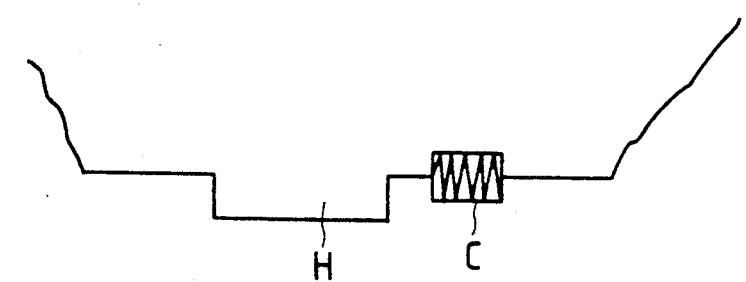

As a result, the video signal output to the modulator 14 does not contain the unrecovered pulse P, as shown in FIG. 2F.

Figure 3:
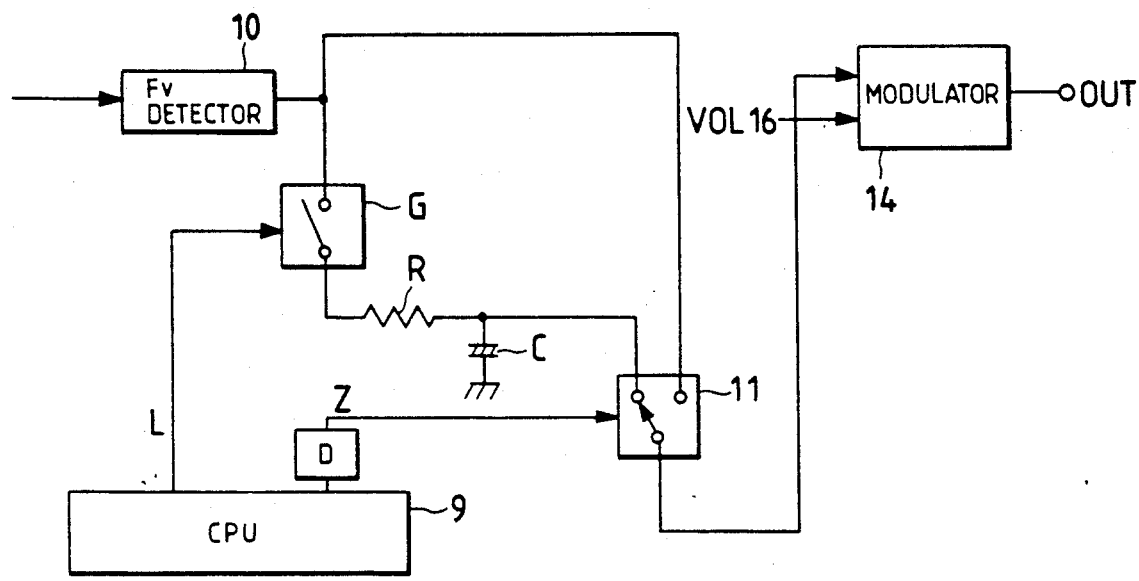
FIG. 3 is a block diagram illustrating a second embodiment of the present invention.

FIG. 3 shows a second embodiment of the present invention, in which the same parts as those in FIG. 1 are designated by the same reference numerals.

In this embodiment, while a detection output obtained from a video signal detector 10 is applied to one input of a video switch 11, the detection output is also applied to a gate G which transmits a signal during a color burst period in accordance with a control signal L from the CPU 9. The color burst output obtained by this gate G is integrated by an integrating circuit constituted by a resistor R and a capacitor C, and the output of the integrating circuit is applied to the other input of the video switch 11.

By use of the output obtained by integrating the color burst signal, one can obtain a DC level equal to or near a pedestal level, and, therefore, obtain the same effect of operation as that in the embodiment shown in FIG. 1.

FIGS. 4A to 4E are timing charts for explaining a modification of the second embodiment, in which only one of the unrecovered pulse P in the back porch is eliminated. FIG. 4A shows the expansion timing signal Y. FIG. 4B shows a control signal $L_1$ which rises at the timing of the fall of the expansion timing signal Y and has a pulse width $t_4$, and may be produced by a one-shot multivibrator. As shown in FIG. 4C, a video switch control signal $Z_1$ may also be produced by another one-shot multivibrator so as to rise at the timing of the fall of the control signal $L_1$ and include the unrecovered pulse P in the back porch. In the manner similar to the second embodiment of FIG. 3, the detection output from the video signal detector 10 is transmitted through the gate G only during the period $t_4$ and integrated by the RC integrating circuit, as shown in FIG. 4D. It is noted that a delay τ of, e.g., 1.0 μsec occurs in the detection output. An output voltage as a result of this integration is substituted for the unrecovered pulse P by the video switch 11 in accordance with the control signal $Z_1$. FIG. 4E shows a resultant video signal output to the modulator 14, in which the unrecovered pulse remains only in the front porch.

This modification has an advantage that since the video switch control signal $Z_1$ is produced by one-shot multivibrators using the trailing edge of the expansion timing signal Y, the signal $Z_1$ can follow jittering of the expansion timing signal Y to surely eliminate the unrecovered pulse P. Furthermore, since a usual TV receiver produces a reference level of a luminance signal by averaging the back porch portion (pedestal clamping), the above modification, in which only the unrecovered pulse in the back porch is eliminated, may suffice to properly generate such a reference signal.

Figure 5:
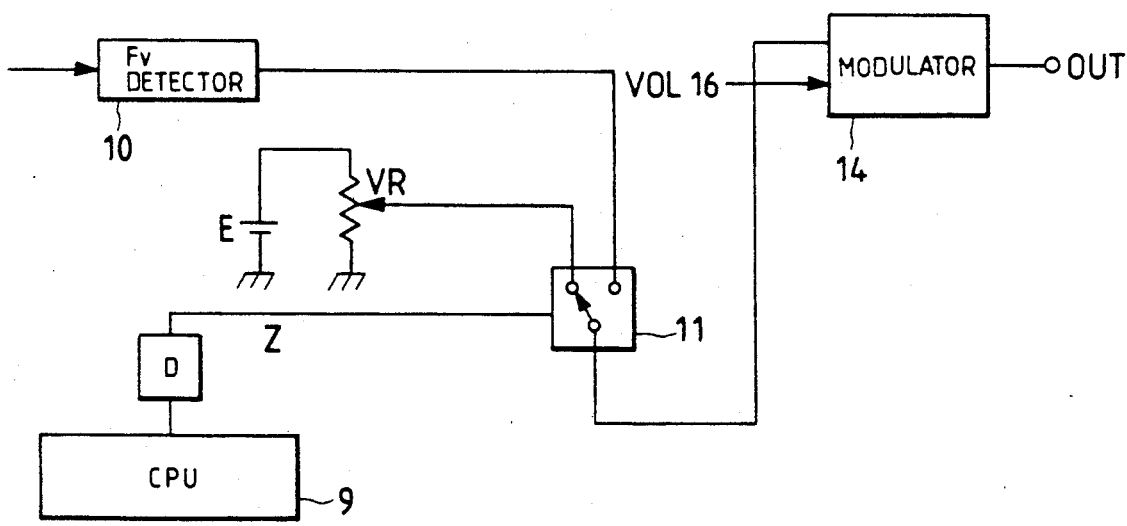
FIG. 5 is a block diagram illustrating a third embodiment of the present invention.
Figure 6A:
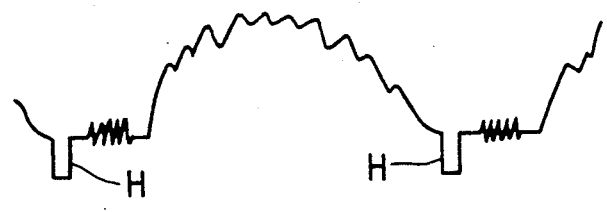
FIGS. 6A to 6E are waveform diagrams for explaining the scrambling and descrambling operations.
Figure 6B:
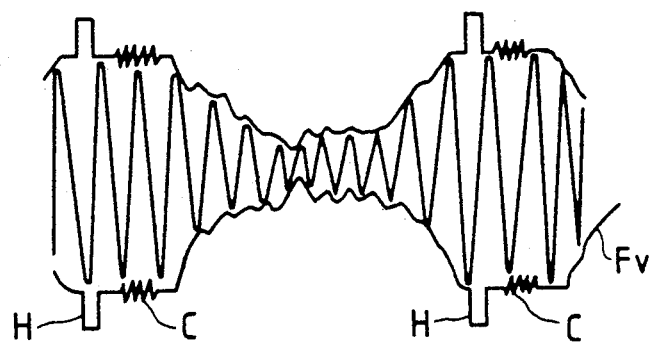
Figure 6C:
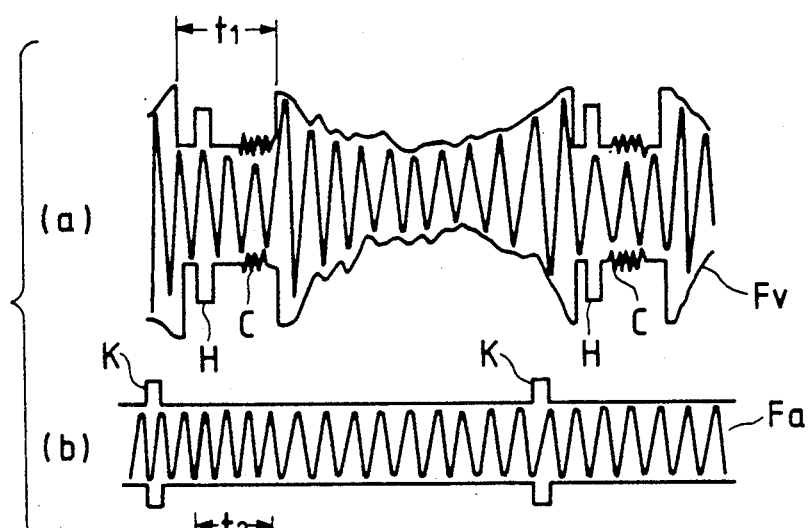
Figure 6D:
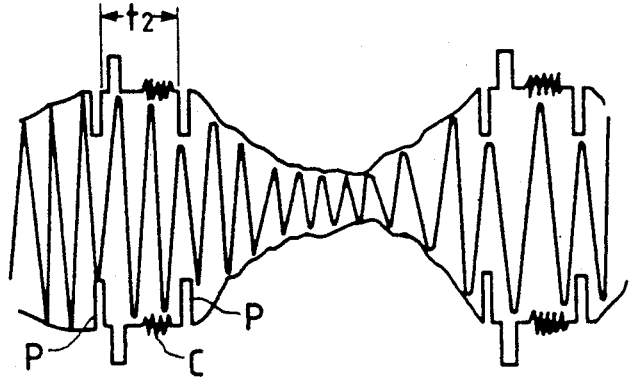
Figure 6E:

FIG. 5 shows a third embodiment of the present invention, in which the same parts as those in FIG. 1 are designated by the same reference numerals.

In this embodiment, a detection output obtained by a video signal detector 10 is applied to one input of a video switch 11, and at the same time a DC voltage, obtained by a fixed DC power supply E and a potentiometer VR for voltage-dividing the supply voltage, is applied to the other input of the video switch 11. If the potentiometer VR is adjusted so as to make the DC output equal to or near a pedestal level of a video signal, then by controlling the switch 11 with the signal Z, the unrecovered pulse can be replaced by the DC output set by the potentiometer VR, so that one can obtain the same effect of operation as that in the embodiment shown in FIG. 1.

As is apparent from the above description, according to the present invention, unrecovered pulses caused by the scrambling and descrambling operations of a GSS system are eliminated. Therefore, one is able to prevent undesirable effects, such as luminance changes and turn-over noises, in a television receiver which is either deteriorated by time aging or imperfectly adjusted. Moreover, one is able to prevent interference to the operation of a black level correction function in a television receiver having such a function.

Another advantage of the invention is that the elimination of the unrecovered pulses can prevent the right and left screen edges of a TV receiver from becoming whitish due to reproduction of those pulses.

Furthermore, the elimination of the unrecovered pulses can reduce their adverse effects on an audio signal.

Further advantage will appear in the case where a VCR (video cassette recorder) is provided between the CATV terminal unit and a TV receiver. The elimination of the unrecovered pulses can prevent overmodulation in a modulator of the VCR.

What is claimed is:

1. In a CATV terminal unit for receiving a video signal in which at least a horizontal synchronizing signal portion thereof is compressed to a specific level during a specific time width, and for expanding said horizontal synchronizing signal portion of said received video signal during a time width narrower than said specific time width, the improvement wherein said unit comprises:

means for replacing at least one of unrecovered pulse portions, produced in front and rear portions of said video signal due to the difference between the respective time widths in compression and expansion, with a signal having a level equal to or near a pedestal level of said received video signal.

2. A CATV terminal unit according to claim 1, further comprising: a detection circuit for performing detection on the received video signal; a level clamp circuit, supplied with a detection output from said detection circuit, for clamping the detected video signal at a pedestal level; and means for substituting said clamp pedestal level for said unrecovered pulse portions in the clamped video signal.

3. A CATV terminal unit according to claim 1, further comprising a detection circuit for performing detection on the received video signal; a gate circuit for extracting a color burst signal from a detection output of said detection circuit; an integrating circuit for integrating said color burst signal and producing a DC output; and means for substituting said DC output for said unrecovered pulse portions in the detected video signal.

4. A CATV terminal unit according to claim 1, further comprising: a detection circuit for performing detection on the received video signal; a voltage source for producing a DC output having a level equal to or near a pedestal level of said received video signal; and means for substituting said DC output for said unrecovered pulse portions in the detected video signal.

5. In a CATV terminal unit for receiving a video signal in which at least a horizontal synchronizing signal portion thereof is compressed to a specific level during a specific time width, and for expanding said horizontal synchronizing signal portion of said received video signal during a time width narrower than said specific time width, in a method of eliminating white level signals to present luminance change and turnover noises, the improvement wherein said method comprises:

the step of replacing at least one of unrecovered pulse portions, produced in front and rear portions of said video signal due to the difference between the respective time widths in compression and expansion, with a signal having a level equal to or near a pedestal level of said received video signal.

6. A method according to claim 5, further comprising the steps of:
detecting the received video signal;
supplying the received video signal to a level clamp circuit to clamp the detected video signal at a pedestal level; and
substituting said clamp pedestal level for said unrecovered pulse portions in the clamped video signal.

7. A method according to claim 5, further comprising the steps of:
detecting said received video signal;
extracting a color burst signal from the detected video signal;
integrating said color burst signal to produce a DC output; and
substituting said DC output for said unrecovered pulse positions 8. A method according to claim 5, further comprising the steps of:
detecting said received video signal;
producing from a voltage source a DC output having a level equal to or near a pedestal level of said received video signal; and
substituting said DC output for said unrecovered pulse portions in the detected video signal.

* * * * *